Patented Mar. 18, 1952

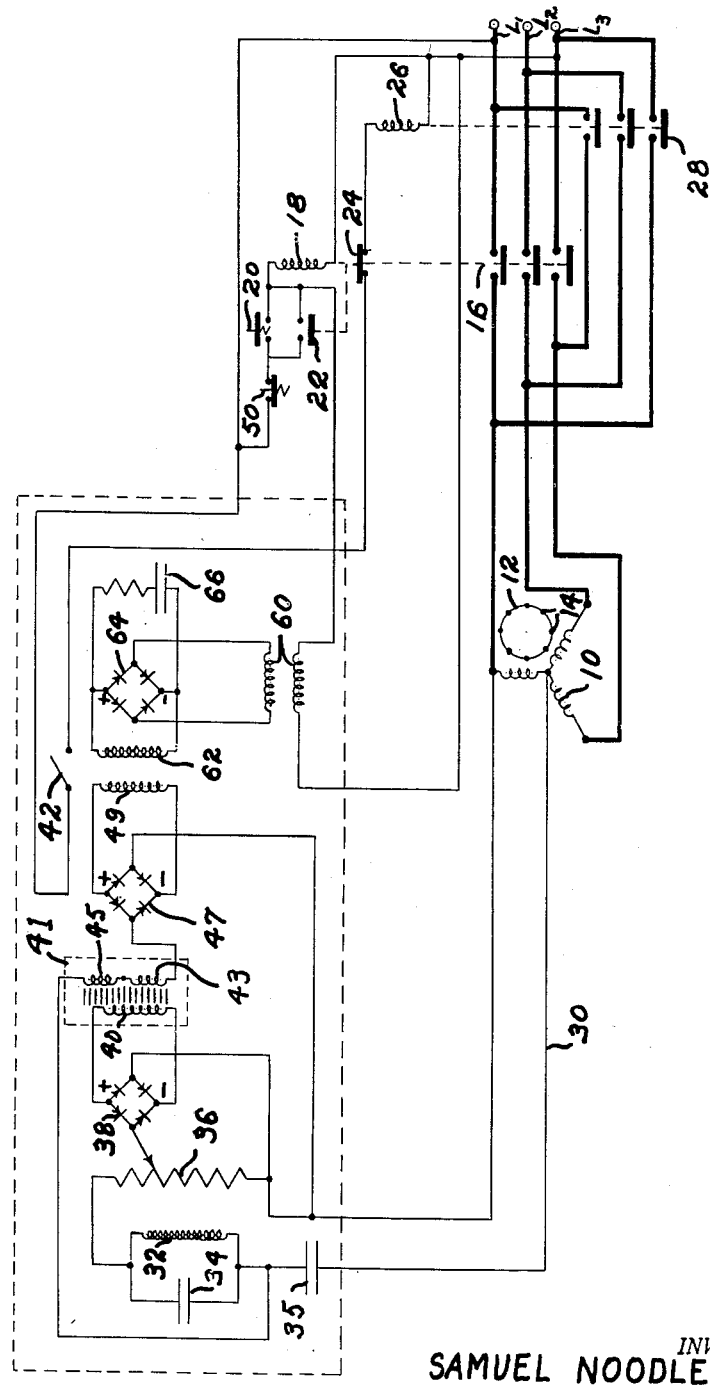

2,589,279

UNITED STATES PATENT OFFICE 2,589,279

SPEED RESPONSIVE PLUGGING FOR ELECTRIC MOTORS

Samuel Noodleman, Dayton, Ohio, assignor to Louis R. Mahrt and D. Robert Laughter, as trustees for the Standard Dayton Corporation, Dayton, Ohio, a corporation of Ohio Application June 16, 1949, Serial No. 99,466

8 Claims. (Cl. 318—210)

This invention relates to a speed responsive control for electric motors and the like.

Various speed responsive relays have been used from time to time for controlling the operation of electric motors and the like, but they have required either some form of mechanical connection to the motors or have been otherwise objectionable.

This invention relates to an improvement over controllers of the type wherein the ripple voltage generated within a motor is used for controlling the operation of the motor. It has been found that the ripple voltage in some motors is fairly small, with the result that it is desirable to provide some means for amplifying the ripple voltage in order to obtain accurate and consistent operation of the relay which depends upon changes in the ripple voltage for its operation. It is an object of this invention to provide a simple and highly practical arrangement for amplifying the ripple voltage.

It has also been found that in certain installations there are parasitic direct current voltages in the power lines which at times leak through the filter and thus load up the relay. Such parasitic voltages may be superimposed upon the 60 cycle power supply as the result of the operation of other equipment such as electric welders and various types of electronic equipment using condensers which when turned on and off feed undesirable impulses back into the line. It is an object of this invention to provide very simple and yet effective means for eliminating the effect of these parasitic voltages.

Other objects and advantages reside in the construction of parts, the combination thereof and the mode of operation, as will become more apparent from the following description.

In the drawing:

The single figure schematically shows a circuit which illustrates a preferred embodiment of my invention.

For the purpose of illustrating one application of my improved ripple voltage operated control relay, I have shown it in the form of a plug controller applied to a conventional three phase motor.

I have found that a high frequency ripple is generated in every type of motor in which a rotor having conductors carrying current pass a stator having teeth and slots. I have also found that this high frequency ripple can be used to actuate a control at a preselected ripple frequency. For a given motor design, the magnitude of the ripple is a function of the product of the rotor speed and current in the rotor bars. The frequency of the ripple is the product of the rotor speed and the number of rotor bars. Thus, a 48 bar rotor operating at 1800 R. P. M. or 30 revolutions per second will have a frequency of 48×30 or 1440 cycles per second. The magnitude of this ripple will be very low when the motor is running at idle speed and will be maximum when the rotor is turning at idle speed and when the field has been reversed as at the instant of plug.

In order to utilize this ripple for control purposes, it is necessary to provide a filter capable of reducing the effect of the line frequency power to the point where it will not affect the relay operation, as will be explained more fully hereinafter. It is also desirable to place a condenser in the line leading to the control so as to prevent stray direct currents from leaking past the filter and thus loading up the relay. It has been found that ripple voltage operated relays will operate more satisfactorily on certain types of motors, if the ripple frequency signal is amplified. The necessary amplification may be obtained in a very simple and practical manner by using a saturable reactor type of magnetic amplifier connected to the output of the first rectifier. However, it is to be understood that electronic amplifiers could also be used for this purpose.

Relays operated in this manner may be used for various purposes such as controlling plugging switches, starting winding switches, speed indicators, speed control mechanisms, as well as a large number of other devices which are to be operated in response to speed changes.

Referring now to the drawing wherein I have shown one embodiment of my invention, reference numeral 10 designates the field windings of a conventional three phase alternating current motor having a revolving armature 12 provided with conventional armature bars 14 which pass through the magnetic flux created by the field windings 10. Reference characters $L_1$, $L_2$ and $L_3$ designate the main power lines used in supplying power to the field windings 10 and reference numeral 16 designates the main switch which when closed supplies power to the motor so as to operate the same in the forward or normal running direction. The switch 16 is controlled by the running solenoid 18 which is under control of a conventional start switch 20. Closing of the start switch 20 causes energization of the solenoid 18 whereby the switch 16 closes and initiates operation of the motor in the forward direction. Energization of the solenoid 18 causes the holding switch 22 to be closed and opens the switch 24 located in series with the reversing solenoid 26. The reversing solenoid 26 controls the motor reversing switch 28 in accordance with conventional practice. The control elements described thus far are standard elements now commonly used in starting and stopping motors.

The circuits shown may be used for plugging any type of motor which can be reversed. Thus, this control can be used on delta-delta and delta-Y motors, or with two phase or single phase motors, as long as the relay connections are properly made so as to pick up the ripple. In order to utilize the ripple voltage in bringing the motor to a plug stop, a relay system has been provided which comprises a first lead wire 30 connected to one of the motor field terminals and to a filter choke 32 and a resonating condenser 34 as shown. The condenser 34 resonates with the filter choke to provide a block for the 60 cycle waves resulting from the 60 cycle power supply. A condenser 35 has been placed in the line 30 so as to block out any direct current which may be fed in from other equipment such as arc welders, electronic devices, condensers, et cetera, connected to receive power from the main power lines $L_1$, $L_2$ and $L_3$.

In the circuit arrangement shown in the drawing, the ripple is supplied to the variable potentiometer 36 which allows one to vary the amount of ripple or voltage fed into the rectifier 38. The rectifier 38 supplies rectified current to the coil 40 which forms a part of a conventional saturable reactor type of magnetic amplifier 41. The flow of current through the coil 40 controls the degree of saturation of the amplifier and consequently controls the rate of flow of current through the coils 43 and 45 of the saturable reactor. The coils 43 and 45 are wound in opposition to one another in accordance with well-known practice.

The input terminals of a rectifier 47 have been connected in series circuit relationship with the coils 43 and 45, as shown, whereby the input to the rectifier 47 will be controlled by the ripple voltage fed into the coil 40. The output of the rectifier 47 is connected to the control relay coil 49 which is designed to hold the switch 42 closed at all times during plugging when the speed of the motor exceeds a predetermined speed, such as 200 R. P. M.

In order to stop the motor, the stop switch 50 is opened whereby the flow of the current to the running solenoid 18 is interrupted. This interruption of current to the solenoid 18 causes the switches 16 and 22 to open and the switch 24 to close. Closing of the switch 24 immediately energizes the reversing solenoid 26 which closes the reversing switch 28, whereby the field torque is reversed and the motor very promptly reduces its speed. This reduction in speed reduces the effectiveness of the ripple voltage to a predetermined point where the control relay solenoid 49 no longer is supplied with power enough to hold the switch 42 closed. Since opening of switch 16 cuts off the supply of current to the field windings of the motor before the reversing switch 26 has had time to close, it is desirable to provide a time delay means for momentarily holding the switch 42 closed during the time interval between the opening of the switch 16 and the closing of switch 28. Upon closing the start switch 20, current is supplied to the condenser 66 and the relay coil 62 through the transformer 60. This causes the coil 62 to close the switch 42. After deenergization of the coil 18 and transformer 16, the charge on the condenser 66 is then available for energizing the solenoid 62 for a period of time sufficient to hold the switch 42 closed until the switch 28 closes. After switch 28 closes, the coil 40 will be supplied with current for holding the switch 42 closed until the reduction in speed indicates that it is time for the switch 42 to open and thereby deenergize the reversing relay 26 so as to open switch 28.

Preferably the arrangement is such so that for most motors the circuit will be opened at a speed even considerably below 200 R. P. M.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention, I claim:

1. In combination with a motor having stator windings and a rotor; a relay system connected across at least a portion of said stator windings to be energized from current generated in said windings; said relay system including means responsive to signals within a given frequency range generated in said stator windings as a result of relative rotation between said rotor and said stator, means for amplifying said signals, and blocking means for blocking other signals within a different frequency range.

2. In combination with a motor having stator windings and a rotor; a relay system connected across at least a portion of said stator windings to be energized from current generated in said windings; said relay system including means responsive to signals within a given frequency range generated in said stator windings, blocking means for blocking other signals within a different frequency range, means for amplifying said first named signals, and means for blocking the flow of direct current to said relay system.

3. In combination with a motor having stator windings and a rotor; a relay system connected across at least a portion of said stator windings to be energized from current generated in said windings; said relay system including means responsive to signals within a given frequency range generated in said stator windings, means for amplifying said signals, blocking means for blocking other signals within a different frequency range, and means for blocking the flow of direct current to said relay system, said last named means comprising a condenser connected in the input side of said relay system.

4. In combination, a polyphase motor having a stator provided with a plurality of phase windings; a source of electric energy; means for connecting said phase windings to said source including switch mechanism for reversing the polarity of at least two of said phase windings so as to reverse the motor torque for braking purposes; a relay system connected across at least a portion of one of said phase windings to be energized from current generated in said windings; and means for operating said switch mechanism by said relay system; said relay system including means for resonating signals within a given frequency range, blocking means for blocking other signals within a different frequency range, and means for amplifying said first mentioned signals.

5. In combination, a polyphase motor having a stator provided with a plurality of phase windings; a source of electric energy; means for connecting said phase windings to said source including switch mechanism for reversing the polarity of at least two of said phase windings so as to reverse the motor torque for braking purposes; a relay system connected across at least a portion of one of said phase windings to be energized from current generated in said windings; and means for operating said switch mechanism by said relay system; said relay system including means for resonating signals within a given frequency range, blocking means for blocking other signals within a different frequency range, and means for amplifying said first mentioned signals, said amplifying means comprising a saturable reactor type of magnetic amplifier.

6. In combination; a motor having stator windings and a rotor; and a speed responsive relay system; said relay system comprising a variable impedance, a blocking means tuned to offer infinite impedance to the power line frequency, means for connecting said variable impedance and said blocking means in series circuit relationship across at least a portion of said stator windings, a first rectifier connected across a portion of said variable impedance, a second rectifier, a saturable reactor type of magnetic amplifier having first coil means connected to the output of said first rectifier for controlling the degree of saturation of the saturable reactor and having second coil means connected across a source of power in series circuit relationship with the input side of said second rectifier, and a control solenoid connected to the output side of said second rectifier.

7. In combination; a motor having polyphase stator windings and a rotor; and a plug controller for stopping said motor, said controller comprising a relay system having a variable impedance, a blocking means tuned to offer infinite impedance to 60 cycle current, a pair of conductors for connecting said variable impedance and said blocking means in series circuit relationship across one phase of said stator windings, a first rectifier connected across a portion of said variable impedance, a second rectifier, a saturable reactor type of magnetic amplifier having first coil means connected to the output of said first rectifier for controlling the degree of saturation of the saturable reactor and having second coil means connected to a source of power in series circuit relationship with the input terminals of said second rectifier, a control solenoid connected to the output of said second rectifier, and means operated by said control solenoid for reversing the phase relationship of said stator windings so as to reverse the motor torque.

8. In combination; a motor having polyphase stator windings and a rotor; and a plug controller for stopping said motor, said controller comprising a relay system having a variable impedance, a blocking means tuned to offer infinite impedance to 60 cycle current, a pair of conductors for connecting said variable impedance and said blocking means in series circuit relationship across one phase of said stator windings, a condenser in one of said conductors for preventing the flow of direct current to said blocking means and said variable impedance, a first rectifier connected across a portion of said variable impedance, a second rectifier, a saturable reactor type of magnetic amplifier having first coil means connected to the output of said first rectifier for controlling the degree of saturation of the saturable reactor and having second coil means connected to a source of power in series circuit relationship with the input terminals of said second rectifier, a control solenoid connected to the output of said second rectifier, and means operated by said control solenoid for reversing the phase relationship of said stator windings so as to reverse the motor torque.

SAMUEL NOODLEMAN.

REFERENCES CITED

The following references are of record in the file of this patent:

UNITED STATES PATENTS

| Number | Name | Date |
| --- | --- | --- |
| 2,165,491 | Leitch | July 11, 1939 |
| 2,442,213 | Ross | May 25, 1948 |
| 2,456,938 | Harder | Dec. 21, 1948 |